United States Patent [19]

Baut et al.

[11] 3,900,917

[45] Aug. 26, 1975

[54] CONNECTING DEVICE FOR OSCILLATING ARMS OF WINDWHIELD WIPER BLADE ASSEMBLIES

[76] Inventors: Jacques Baut, 213 boulevard du Souverain, 1160 Brussels, Belgium; Paul Journée, Chateau de Reilly, 60 Reilly (par Chaumont-en-Vexin), France

[22] Filed: Mar. 20, 1973

[21] Appl. No.: 343,157

[30] Foreign Application Priority Data
Oct. 31, 1972 France .............................. 72.38532

[52] U.S. Cl. ............................................. 15/250.32
[51] Int. Cl. ............................................. B60s 1/40
[58] Field of Search ....... 15/250.31, 250.32, 250.36, 15/250.42

[56] References Cited
UNITED STATES PATENTS

| | | | |
|---|---|---|---|
| 3,049,743 | 8/1962 | Graczyk et al. | 15/250.32 |
| 3,056,160 | 10/1962 | Oishei et al. | 15/250.32 |
| 3,405,419 | 10/1968 | Charlton | 15/250.32 |
| 3,621,507 | 11/1971 | Allaria et al. | 15/250.32 |

FOREIGN PATENTS OR APPLICATIONS

| | | | |
|---|---|---|---|
| 1,314,513 | 12/1962 | France | 15/250.32 |
| 1,406,559 | 6/1965 | France | 15/250.32 |
| 823,032 | 11/1959 | United Kingdom | 15/250.32 |
| 1,096,916 | 12/1967 | United Kingdom | 15/250.32 |

*Primary Examiner*—Peter Feldman
*Attorney, Agent, or Firm*—Bacon & Thomas

[57] ABSTRACT

The invention pertains to a connecting device for connecting a wiper blade assembly to a windshield wiper arm, said device being so designed that it can selectively be connected to a wiper arm having a catch-spur on its end or to an arm having lateral notches in its extremity.

2 Claims, 18 Drawing Figures

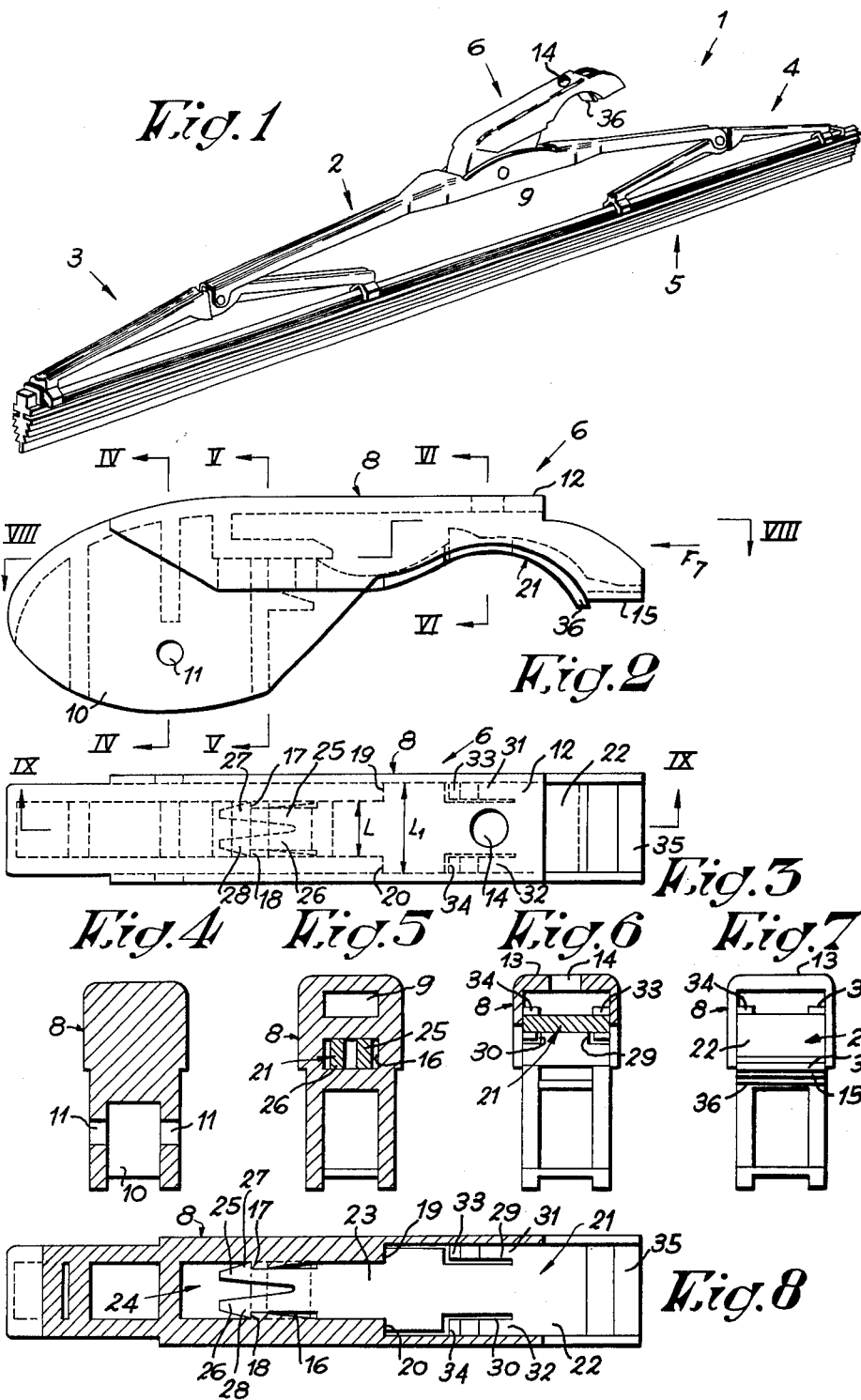

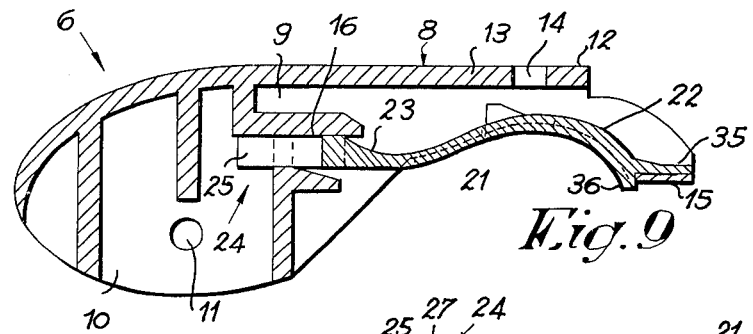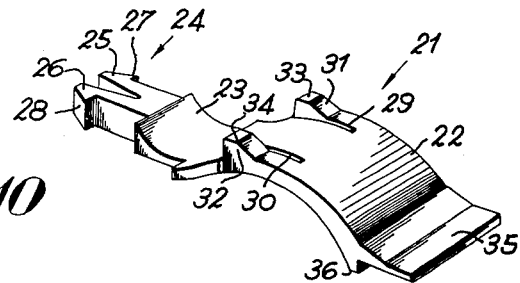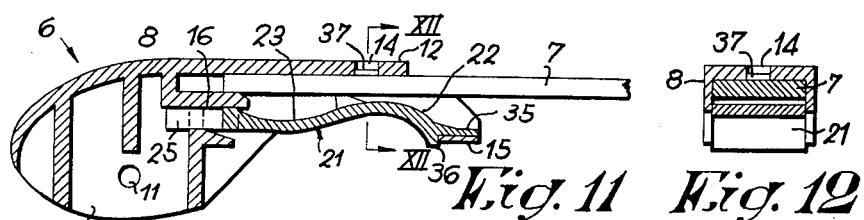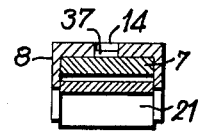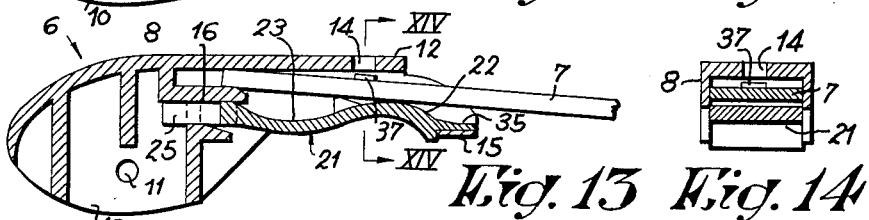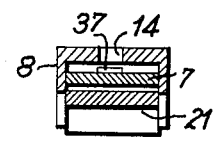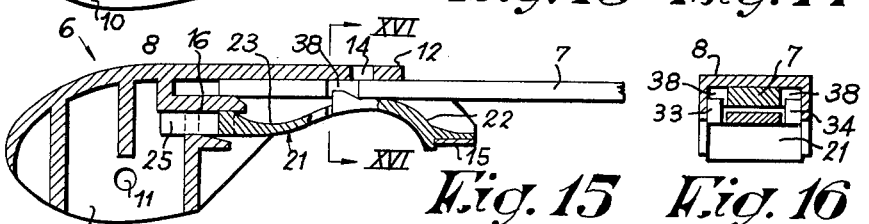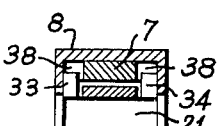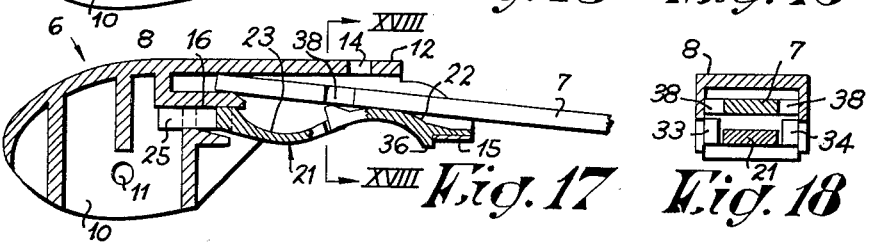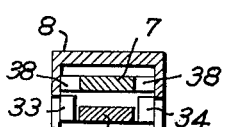

CONNECTING DEVICE FOR OSCILLATING ARMS OF WINDWHIELD WIPER BLADE ASSEMBLIES

The object of the present invention is to provide a connecting device for connecting a windshield wiper blade assembly to a windshield wiper arm, the latter being either of the catch-spurred bayonet type or of the notched bayonet type.

By this provision, the field of application of the connecting device is greatly widened.

The invention consists in designing the connecting device in two distinct parts, one jointed to the central portion of the windshield wiper blade support, the other being connected, respectively hooked to the first, said second part being a flexible strip, forming an arch and counterarch and being shaped so as to permit either the engagement of a catch-spur carried by the end of a wiper arm into a hole suitably located in said first part, or the interengagement of catch-spurs provided in said second part or strip with lateral notches carried by another type of wiper arm.

Furthermore, according to another characteristic of the invention, said relatively elastic strip is profiled, in its rear part, so as to present catch spurs in such a way that the interconnection between said strip and said part jointed to the wiper blade support is obtained by a simple engagement motion ending in an automatic interlocking of the two parts.

These characteristics embodied in parts of various shapes in accordance with the shape and dimensions of the adjacent parts of the two constitutive parts of the connecting device and with the shape of the extremity of the windshield wiper arm.

The characteristics of the invention will be more clearly apparent from a practical embodiment described in detail hereinafter with references to the appended drawings, in which:

FIG. 1 is a perspective view of the windshield wiper blade assembly equipped with the connecting device according to the invention;

FIG. 2 is a side enlarged scale view of the connecting device;

FIG. 3 is a horizontal projection of the device shown in FIG. 2;

FIGS. 4, 5 and 6 are, respectively, cross-sections taken along lines IV—IV, V—V and VI—VI of FIG. 2;

FIG. 7 is an end-view of the device, as seen in the direction indicated by arrow F7 in FIG. 2;

FIG. 8 is a horizontal section along line VIII—VIII of FIG. 2;

FIG. 9 is a longitudinal section taken along line IX—IX of FIG. 3;

FIG. 10 is a perspective view of the elastic strip which constitutes the second constitutive part of the connecting device according to the invention;

FIG. 11 is a longitudinal section of the connecting device during connection with a catch-spurred wiper arm;

FIG. 12 is a cross-section taken along line XII—XII of FIG. 11;

FIG. 13 is similar to FIG. 11, the connecting device being however shown in the disconnecting position, respectively in the pre-connection position;

FIG. 14 is a cross-section taken along line XIV—XIV of FIG. 13;

FIG. 15 is a longitudinal section of the same device as that shown in FIG. 11 during its connection with a bayonet arm having lateral notches;

FIG. 16 is a cross-section taken along line XVI—XVI of FIG. 15;

FIG. 17 is similar to FIG. 15, the connecting device being shown in the unhooking stage, respectively in a stage preparatory to hooking up; and FIG. 18 is a section taken along line XVIII—XVIII of FIG. 17.

FIG. 1 shows a windshield wiper blade assembly 1 composed in the known manner of a main bridge 2, two swingle bars connected to each extremity of the bridge 3–4, the squeegee 5 and the connecting device 6.

The connecting device according to the invention is applicable to all other types of windshield wiper assemblies, differing by the number and shape of the various articulated parts of the windshield wiper blade support, located between the squeegee and the windscreen wiper arm 7.

The connecting device according to the invention is in the present case constituted by two parts which are clearly distinguished from one another, both in shape and in functions. The first part 8 is composed of a housing 9 having a rearwardly directed appendage 10 perforated with one or several coaxial holes 11, by means of which the housing 9 may be articulated on the central part of the main bridge 2. The housing 9 extends forwardly in a prow 12 whose upper surface has a hole 14 and its fore-end, a supporting cross-plate 15. At the base of said prow 12, this first part 8 is provided with a passage 16 flanked on either side by backstops 17 and 18.

The width L of this passage 16 is smaller than the width L1 of the adjacent part of said prow 12, thus leaving two stops 19–20 to check the introduction of the second part 21, constituting the connecting device according to the invention.

This second part is of relatively complex design but can be very economically produced as by moulding. It is constituted, in the present case, of an arch 22 prolonged by a counterarch 23 which in turn extends in the form of a securing fork 24 whose two prongs 25 and 26 have arrow-heads 27–28.

The arch 22 has two parallel kerfs 29 and 30 delimitting two hooking up tongues, 31 and 32, respectively, the ends of which being profiled so as to constitute two catch-spurs 33 and 34 respectively. Towards its free extremity the arch-shaped segment 22 extends into a flat end 35, equipped with a heel 36 on its lower surface. This second part 21 is such that, by simple introduction of the securing fork 24 into the passage 16, the arrow-heads 27 and 28 abut, after a temporary elastic deformation of the prongs, against said backstops 17 and 18. In this interlocked position, the end 35 comes into contact with the cross-plate 15 against the back of which the heel 36 comes to rest. A good interlocking is thereby obtained between the two constitutive parts, 8 and 21 respectively, of the connecting device. Whether the end of the windshield wiper arm is fitted with back-stops 37 or with lateral indentures 38, the connection or disconnection operation of said arms' end 7 remains the same as it is achieved by inducing the temporary deformation of the flexible part 21 by means of the corresponding part of the windshield wiper arm (FIGS. 11 to 18).

The two parts 8 and 21 can be manufactured from the same or from different materials, such as plastic and/or metal.

If the connecting device according to the invention is manufactured entirely from plastic, two plastic materials of different physical properties may advantageously be chosen for part 8 and for part 21 in view of the fact that, although they act as an integrated unit, the two constitutive parts have nevertheless to meet different requirements.

Part 8 should be more rigid than part 21, while the latter will have to comply with flexibility requirements. Accordingly, a relatively stiff plastic material will be chosen for part 8 and a relatively elastic plastic material for part 21.

It is suggested, in a purely illustrative and non-restrictive context, to utilize a reinforced polyamide-type resin for the rigid part and an acetal-type resin for the flexible part.

Naturally, it will also be possible to incorporate all accessory elements or devices facilitating, among other things, the elastic deformation of part 21 during the disconnection process.

This manual operation, which is conventional in every way and of current use, offers the advantage of prohibiting untimely or accidental release of the connecting device, especially during windshield cleaning.

The invention covers both the connecting device itself as well as all windshield wiper blade assemblies equipped with such a connecting device.

It is understood, that although preference is given to the utilization of a relatively rigid plastic material for the hollow component and of a relatively flexible plastic material for the complementary part or parts, any other appropriate synthetic or natural material may be used, provided the same advantages are obtained.

What we claim is:

1. A connector for connecting a windshield wiper assembly to a wiper arm, said connector comprising:
    a first relatively rigid member defining a passage for receiving an end of a wiper arm and having a first wall;
    a second resilient member defining a wall of said passage opposite said first wall and being arched towards said first wall to press a wiper arm thereagainst;
    said second member further being provided at one end with resilient latch means holding said one end to said first member, said resilient latch means comprising a pair of resilient prongs extending from said one end of said second member each prong having a lateral projection thereon, a socket in said first member having abutments therein engaging said projections to prevent withdrawal of said prongs from said socket.

2. A connector according to claim 1, wherein said second member bears at its other end against a portion of said first member to hold said other end against movement away from said first wall.

* * * * *